US005847741A

United States Patent [19]

Lee

[11] Patent Number: 5,847,741

[45] Date of Patent: Dec. 8, 1998

[54] IMAGE FORMING APPARATUS AND PRINT CONTROL METHOD THEREFOR

[75] Inventor: Bong-Gi Lee, Gwacheon, Rep. of Korea

[73] Assignee: SamSung Electronics Co., Ltd., Suwon, Rep. of Korea

[21] Appl. No.: 696,133

[22] Filed: Aug. 13, 1996

[30] Foreign Application Priority Data

Aug. 14, 1995 [KR] Rep. of Korea .................. 1995/25003

[51] Int. Cl.$^{6}$ ........................................................ B41J 2/47

[52] U.S. Cl. ............................................ 347/153; 347/262

[58] Field of Search .................................... 347/262, 264, 347/153, 139; 346/139

[56] References Cited

U.S. PATENT DOCUMENTS

| | | |
|---|---|---|
| 4,635,072 | 1/1987 | Conrads et al. . |
| 4,819,025 | 4/1989 | Takahashi et al. . |
| 5,130,749 | 7/1992 | Tanada . |
| 5,184,179 | 2/1993 | Tarr et al. . |
| 5,249,060 | 9/1993 | Ishikawa et al. . |
| 5,316,289 | 5/1994 | Matsuo . |
| 5,398,100 | 3/1995 | Ishizu et al. . |
| 5,485,247 | 1/1996 | Morishita et al. . |
| 5,485,553 | 1/1996 | Kovalick et al. . |
| 5,694,158 | 12/1997 | Kato et al. ............................ 347/262 |

*Primary Examiner*—Mark J. Reinhart
*Attorney, Agent, or Firm*—Robert E. Bushnell, Esq.

[57] ABSTRACT

A print control method of an image forming apparatus having a print engine unit which is controlled by a command applied from an external device and prints an image in accordance with image data applied from the external device on a recording medium by a page unit. The method includes the steps of: standing-by a reception of a print command signal from the external device in a stand-by state; detecting an operation state of the external device after starting a print operation in response to the received print command signal; printing an image in accordance with image data on printing paper, discharging the printed paper to outside of the image forming apparatus, and then executing a stand-by mode, when the external device is in a normal state; and stopping a print operation and then performing error processing operation, after discharging printing paper in state of white paper to outside of the image forming apparatus, when the external device is in an abnormal state.

14 Claims, 4 Drawing Sheets

IMAGE FORMING APPARATUS AND PRINT CONTROL METHOD THEREFOR

This application makes reference to, incorporates the same herein, and claims all benefits accruing under 35 U.S.C §119 from an application entitled Print Control Method Of Image Forming Apparatus earlier filed in the Korean Industrial Property Office on 14 Aug. 1995, which was duly assigned Ser. No. 25003/1995 by that Office.

BACKGROUND OF TIRE INVENTION

1. Field of the Invention

The present invention relates to an image forming apparatus which prints an image on a recording medium, and particularly to a method for controlling a print engine unit of the image forming apparatus which prints the image on the recording medium by a page unit.

2. Description of Related Art

Generally, in an image forming apparatus such as a printer using an electrophotographic developing method e.g., a laser beam printer, a plain paper facsimile machine or a digital copying machine, etc., an image is printed on a recording medium, such as paper, in page units. Such an image forming apparatus is controlled by an external device, such as a video controller, and includes a print engine unit for printing the image page-by-page on the recording medium in accordance with image data which is applied from the external device.

In such an image forming apparatus, due to a high-voltage generated by the print engine unit, or static electricity which may have been generated by contact with an operator, etc., various circuit elements, such as an IC (Integrated Circuit) chip of an internal video controller, may be ruined or operate abnormally. Accordingly, an abnormal state of the video controller may often be generated. Thus, when an undesired command is transmitted to the print engine unit from the video controller, the print engine unit may perform sequential abnormal operations. Examples of such a malfunction of the print engine unit include: printing white images on papers continuously discharged from a paper cassette, that is, the printed paper has no image printed thereon; or a fixing unit develops an abnormal high-temperature state, etc.

U.S. Pat. No. 5,398,100 by Masanori Ishizu, et. al., entitled Image Recording Apparatus Operable With A Vertical Scan Synchronizing Signal, and incorporated herein by reference, describes a laser printer type image recording apparatus having a print engine which transmits a vertical synchronizing request signal to a controller in response to a print command from the controller. The controller then transmits a vertical synchronizing signal to the print engine in order to synchronize the image data and print engine. When the print engine fails to receive the vertical synchronizing signal after a predetermined time interval an error occurs and the print operation is stopped. A problem exists, however, in that when the print engine receives the print command a feed sheet roller feeds a paper to be printed on to a position of the registration rollers. Accordingly, when an error occurs, and the print operation is stopped, the fed paper causes a paper jam to occur.

SUMMARY OF THE INVENTION

Accordingly, it is an object of the present invention to provide a print control method capable of preventing a malfunction of a print engine unit when a print command is abnormally applied thereto.

It is another object of the present invention to clear a fed paper from the image forming apparatus when an abnormal operation occurs.

To achieve these and other objects, in an image forming apparatus including a print engine unit which is controlled by a command applied from an external device, and a print control method thereof, an image is printed in accordance with image data applied from the external device on a recording medium by a page unit. The method comprises the steps of: waiting for reception of a print command signal from the external device during a stand-by state; detecting an operation state of the external device after starting a print operation in response to a received print command signal; printing an image in accordance with image data on printing paper, discharging the printed paper to a receptacle outside of the image forming apparatus, and then executing a stand-by mode, when the external device is in a normal state; and stopping a print operation and then performing an error processing operation, after discharging printing paper in a state of white paper to the receptacle outside of the image forming apparatus, when the external device is in an abnormal state. Then, the print operation is stopped and the error state is recovered.

BRIEF DESCRIPTION OF THE DRAWINGS

A more complete appreciation of the invention, and many of the attendant advantages thereof, will be readily apparent as the same becomes better understood by reference to the following detail description when considered in conjunction with the accompanying drawings in which like reference symbols indicate the same or similar components, wherein.

The preferred embodiment of the present invention is described hereinafter with reference to the accompanying drawings. In the following description, numerous specific details are set forth in order to provide a thorough understanding of the present invention. It will be understood by those skilled in the art that other embodiments of the present invention may be practiced without these specific details, or with alternative specific details. Further, a detailed explanation of the function and structure capable of obscuring subject matter of the present invention will not be described.

DETAILED DESCRIPTION OF THE PREFERRED EMBODIMENT

Figure 1:
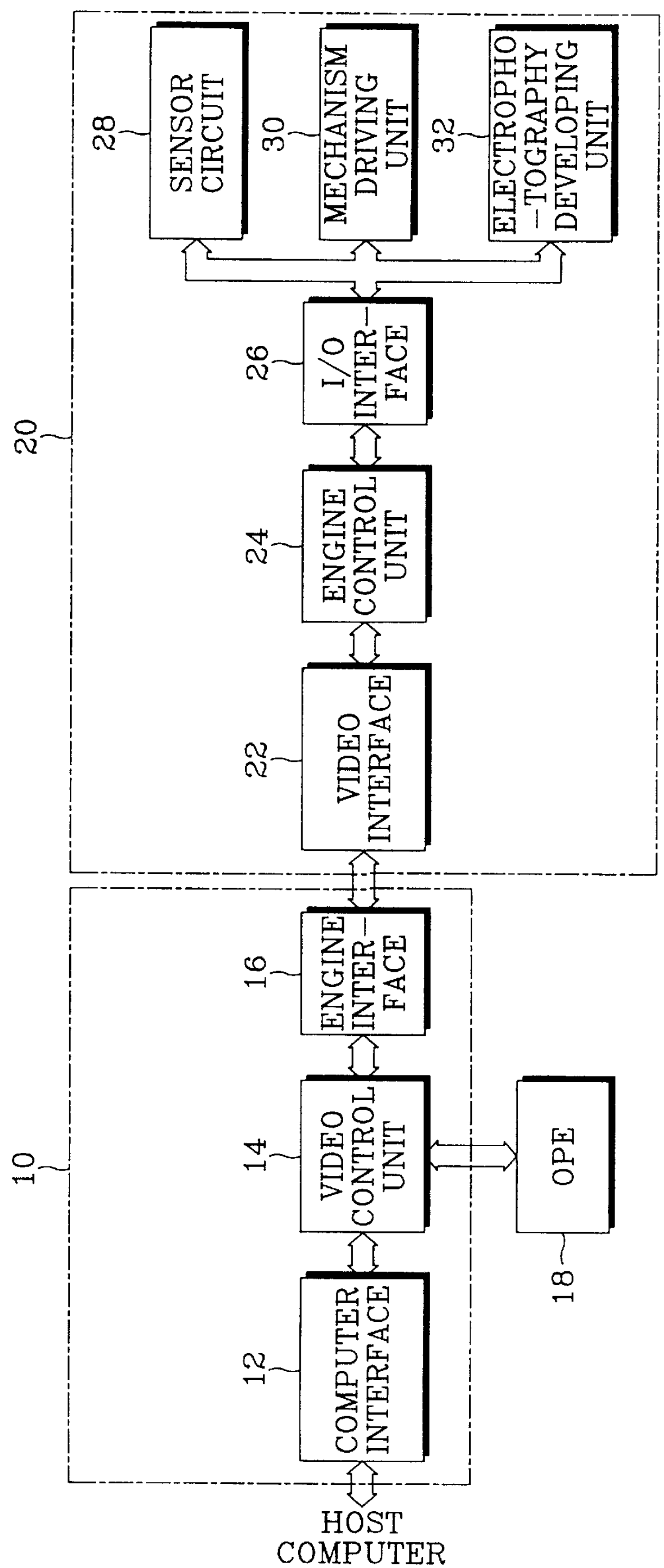
FIG. 1 is a block diagram illustrating the structure of a page printer.

FIG. 1 is a block diagram illustrating a printer using the electrophotographic developing method, which is a type of an image forming apparatus for printing an image on a recording medium by a page unit. As shown in FIG. 1, the printer comprises a video controller 10, an operating panel equipment 18 (referred as to OPE, hereinafter) and a print engine unit 20. Video controller 10 includes a computer interface 12, a video control unit 14 connected to OPE 18, and an engine interface 16 connected print engine unit 20. Computer interface 12 provides an interface for transmitting/receiving signals between a host computer (not shown) and video control unit 14. Video control unit 14 communicates with the host computer and controls print engine unit 20 according to command input from the host computer and from OPE 18 to perform various operations including an image print operation. Video control unit 14 generates image data, of an image desired to be printed, from print data received from the host computer and provides the generated image data to print engine unit 20 via engine interface 16. Engine interface 16 provides an interface for transmitting/receiving signals between video control unit 14 and print engine unit 20. OPE 18 includes a number of keys (not shown) for inputting various kinds of commands, and a displaying device (not shown) for displaying information in accordance with the commands and print operations.

Print engine unit 20 comprises a video interface 22, an engine control unit 24, an input/output (I/O) interface 26, a sensor circuit 28, a mechanism driving unit 30 and an electrophotographic developing unit 32. Video interface 22 provides an interface for transmitting/receiving signals between video controller 10 and engine control unit 24. Engine unit 24 controls mechanism driving unit 30 and electrophotographic developing unit 32 via I/O interface 26 according to the commands generated by video controller 10 and OPE 18 in order to print an image in accordance with image data inputted from video controller 10 on printing paper by page units. Engine control unit 24 senses operation states of each element of print engine unit 20, paper feed and transfer states, the present amount of developing material and so on, from signals transmitted thereto from sensor circuit 28 via I/O interface 26. I/O interface 26 is connected in common to engine control unit 24, sensor circuit 28, mechanism driving unit 30 and electrophotographic developing unit 32 to thereby interface input/output signals of engine control unit 24. Sensor circuit 28 drives various sensors for sensing an operation state of each element of print engine unit 20, paper feed and transfer states, the present amount of developing material, and so on, and provides a sensing signal of each sensor to engine unit 24. Mechanism driving unit 30 drives many kinds of mechanisms for feed, transfer and print of printing paper according to the control of engine control unit 24. Electrophotographic developing unit 32 is controlled by engine control unit 24 to print the image in accordance with image data on printing paper by using an electrophotographic developing method.

Figure 2:
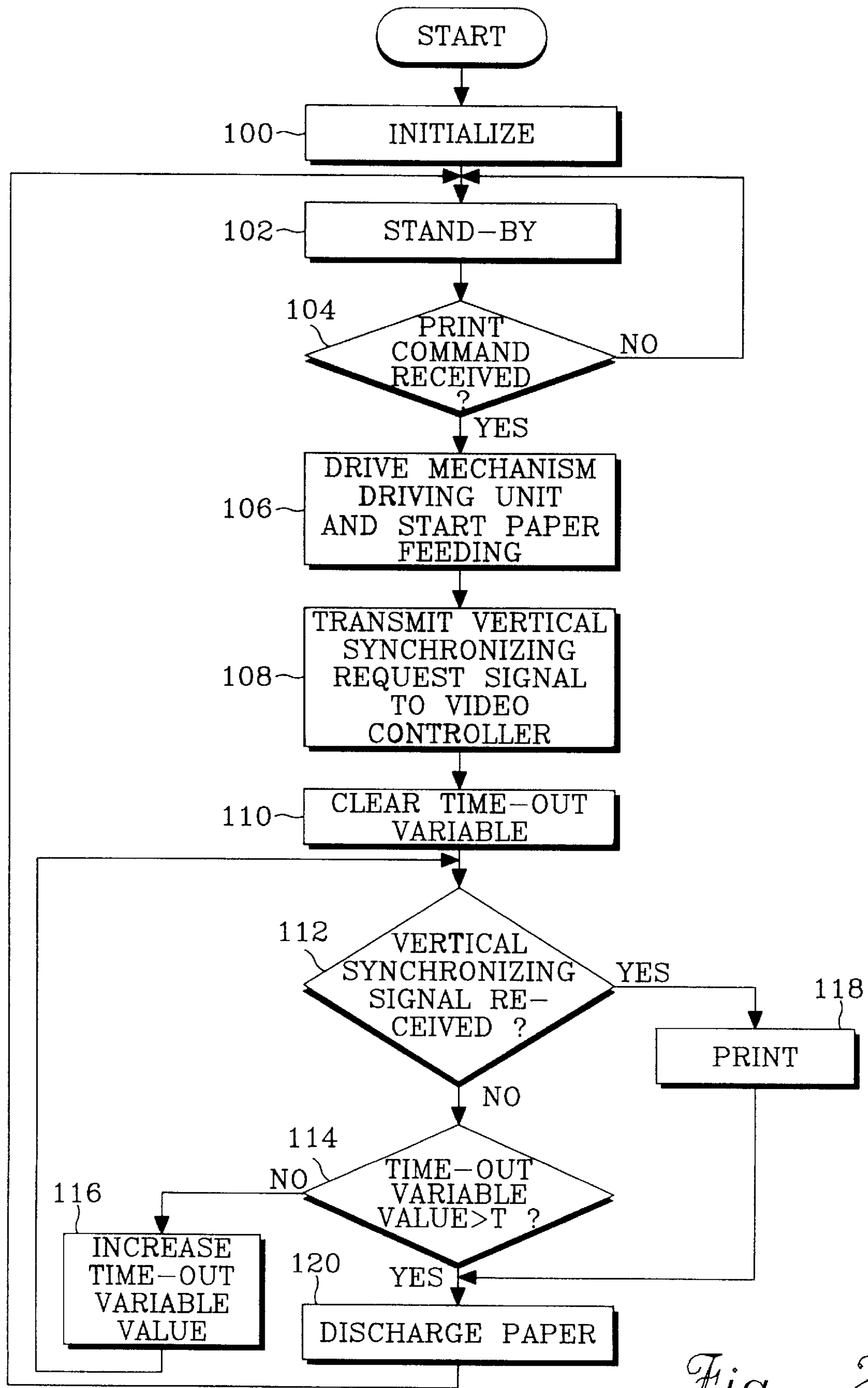
FIG. 2 is a flow chart illustrating one print control operation of the print engine unit of the page printer of FIG. 1.

Referring, now, to FIG. 2 a flow chart illustrating one print control operation for controlling print engine unit 20 of FIG. 1 is shown. When power to print engine unit 20 is ON, engine control unit 24 initializes each element of print engine unit 20 in step 100. After the initializing step, engine control unit 24 executes a stand-by mode of operation, step 102, during which time engine control unit 24 provides information to video controller indicative of the stand-by state and waits for reception of a print command signal, step 104, from video controller 10. When data desired to be printed is present, video controller 10 applies a print command signal to print engine unit 20, and engine control unit 24 detects the print command signal in step 104. Engine control unit 24 drives mechanism driving unit 30, step 106, to start a paper feed operation in response to the print command signal. After sensors of sensor circuit 28 detect that the paper fed during step 106 has been reached a print position by detecting, for example, the leading edge of the paper, print engine unit 20 goes into a print state and engine control unit 24 transmits a vertical synchronizing request signal to video controller 10 through video interface 22 in step 108, and in step 110, a time-out variable is cleared.

The vertical synchronizing request signal is a signal requesting transmission of a vertical synchronizing signal from video control unit 14 for synchronization of the page unit. In response to the vertical synchronizing request signal received from print engine unit 20, video controller 10 synchronizes image data of the image desired to be printed with the vertical synchronizing request signal to thereby transmit the synchronized result and the vertical synchronizing signal to print engine unit 20.

The time-out variable is provided for counting the time lapsed from the point that engine control unit 24 transmits the vertical synchronizing request signal to video controller 10. In step 112 engine control unit 24 checks for reception of the vertical synchronizing signal transmitted from video controller 10. When step 112 determines that the vertical synchronizing signal has not been received, engine control unit 24 checks, step 114, whether the time-out variable value is greater than a designated time T, and increases the time-out variable value, step 116, until the vertical synchronizing signal is received from video controller 10 in step 112 or until the time-out variable becomes greater than T in step 114. The designated time T is generally set to several hundred microseconds ($\mu$s). When the vertical synchronizing signal is received within the designated time T after the vertical synchronizing request signal is transmitted in step 112, engine control unit 24 controls mechanism driving unit 30 and electrophotographic developing unit 32 to thereby print, step 118, the image in accordance with image data on the paper and then the printed paper is discharged, step 120, to an external portion of the printer. After the printed paper is discharged, step 102 is again performed.

If the vertical synchronizing signal is not received during time T in step 112 and engine control unit 24 determines in step 114 that the time-out variable has become greater than time T, no print operation is performed and the paper fed by step 106 is then discharged and in state of white paper, and step 102 is again performed. This case of discharging paper without printing an image thereon is generated due an abnormal state of video controller 10, as mentioned above. Thus, due to the abnormal state of video controller 10, the paper is discharged in state of white paper to an external portion of the printer.

When an image is to be printed on more than one page, then the print command is continuously applied to print engine unit 20. When video controller is operating in a normal state the image is printed page-by-page and discharged from the printer. When video control 10 is operating in an abnormal state, however, print engine unit 20 continuously discharges the pages one by one, each page having a state of white papers. When this abnormal occurs and if a user does not remain in the vicinity of the printer, non-printed paper within a paper feed cassette (not shown) continues to be discharged to the outside of the printer until the print command is no longer received in step 104. Additionally, a fire, caused by an abnormal high temperature state of the fixing unit (not shown), may be generated during the above mentioned abnormal state of operations. Further, there is a problem in that the life of each element of print engine unit 20 is shortened.

Figure 3:
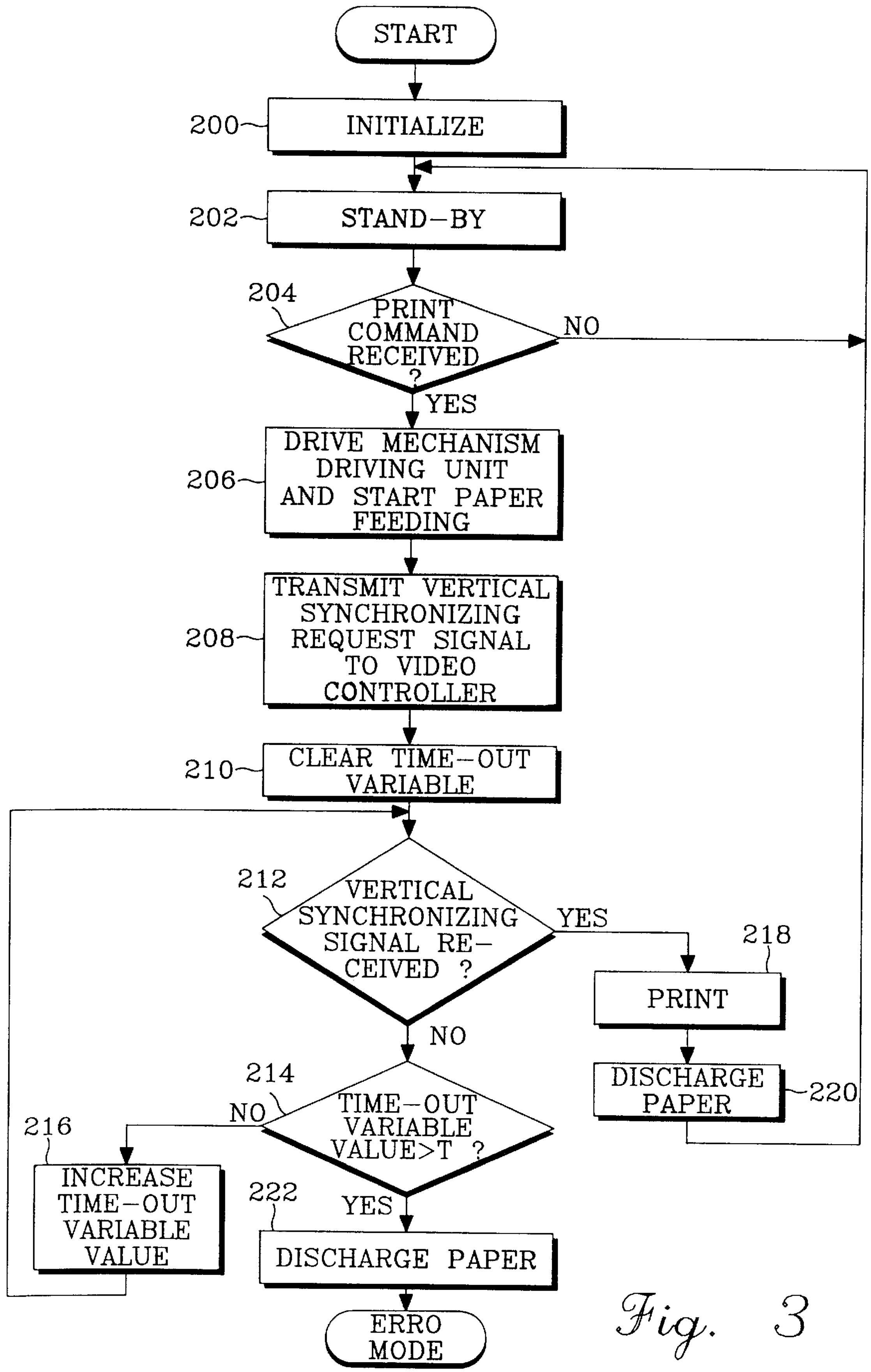
FIG. 3 is a flow chart illustrating another print control operation of an engine unit in accordance With principles of the present invention.

FIG. 3 shows a flow chart illustrating the print control operation of print engine unit 20 in accordance with the present invention.

Referring now to FIGS. 1 and 3, when power to print engine unit 20 is ON, engine control unit 24 initializes each element of print engine unit 20 in step 200. After the initializing step, engine control unit 24 executes a stand-by mode of operation, step 202, during which time engine control unit 24 provides information to video controller 10 indicative of the stand-by state and waits for reception of a print command signal, steps 204–202, from to be controller 10. When data desired to be printed is present, video controller 10 applies a print command signal to print engine unit 20, and engine control unit 24 detects the print command signal in step 204. Engine control unit 24 drives mechanism driving unit 30, step 206, to start a paper feed operation in response to the print command signal. After sensors of sensor circuit 28 detect that the paper fed during step 206 has been reached a print position, print engine unit 20 goes into a print state and engine control unit 24 transmits a vertical synchronizing request signal to video controller 10 through video interface 22 in step 208, and in step 210, a time-out variable is cleared.

The time-out variable is provided for counting the time lapsed from the point that engine control unit 24 transmits the vertical synchronizing request signal to video controller 10. In step 212 engine control unit 24 checks for reception of the vertical synchronizing signal transmitted from video controller 10. When step 212 determines that the vertical synchronizing signal has not been received, engine control unit 24 checks, step 214, whether the time-out variable value is greater than a designated time T, and increases the time-out variable value by a predetermined time increment value, step 216, until the vertical synchronizing signal is received from video controller 10 in step 212 or until the time-out variable becomes greater than T in step 214. The designated time T is generally set to several hundred microseconds ($\mu$s). When the vertical synchronizing signal is received within the designated time T after the vertical synchronizing request signal is transmitted in step 212, engine control unit 24 controls mechanism driving unit 30 and electrophotographic developing unit 32 to thereby print, step 218, the image in accordance with image data on the paper and then the printed paper is discharged, step 220, to an external portion of the printer. After the printed paper is discharged, step 202 is again performed.

If the vertical synchronizing signal is not received during time T in step 212 and engine control unit 24 determines in step 214 that the time-out variable has become greater than time T, no print operation is performed and the paper fed by step 206 is then discharged and in a state of white paper in step 222. Accordingly, engine control unit 24 determines that video controller 10 is operating in an abnormal state and executes an error mode of operation for processing the error without printing more paper in the state of white paper to an external portion of the printer. When the error is corrected then no paper jam will occur since the fed sheet of paper has already been discharged.

Accordingly, the present invention has advantages capable of preventing printing papers from being continuously discharged in states of white papers, due to continuous operation while a print command is being received, when video controller 10 operates in an abnormal state, and a fixing unit is kept from being obtaining an abnormal high-temperature state.

Figure 4:
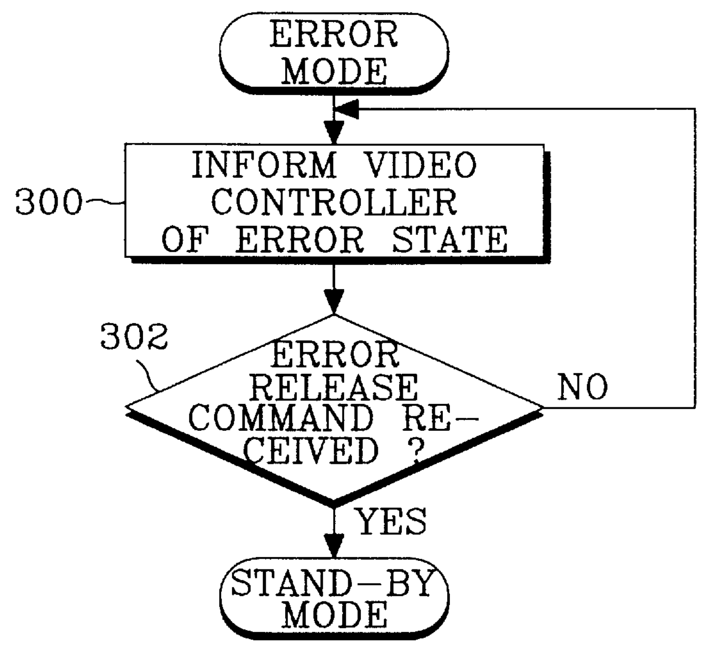
FIG. 4 is a flow chart illustrating an error processing operation of the print engine unit in accordance with the principles of the present invention.

FIG. 4 shows a flow chart illustrating an error processing operation engine control unit 14 of print engine unit 20 when it is determined that video controller 10 is operating in an abnormal state. Engine control unit 24 informs, in step 300, video controller 10 than error state exists, and in step 302, waits for reception of an error release command from video controller 10. When the error release command is received, engine control unit 24 returns to the stand-by state, i.e., step 202.

Figure 5:
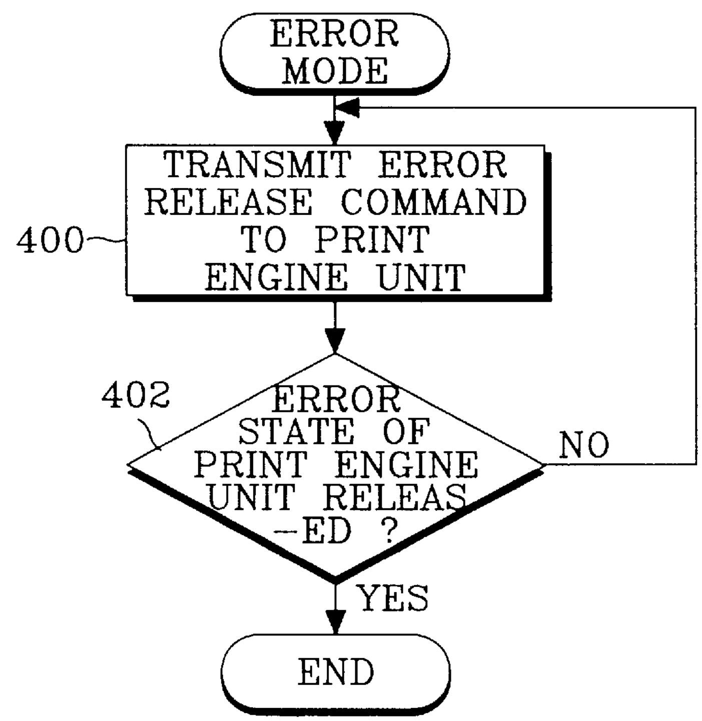
FIG. 5 is a flow chart illustrating an additional error processing operation of a video control is unit in accordance with the principles of the present invention.

When video controller 10 returns to a normal operative state, video control unit 14 performs an error processing operation as shown in FIG. 5. At this time, video control unit 14 transmits the error release command to print engine unit 20 in step 400, and then in step 402, waits for an indication of the release of the error state by engine control unit 24.

When the error release command is received from video controller 10 during step 302 (FIG. 4), the error state of engine control unit 24 is released and accordingly engine control unit 24 executes the stand-by mode in step 202 (FIG. 3). Accordingly, video control unit 14 terminates the error processing operation and performs the normal operation.

In the present invention, as previously described, when an external device is in an abnormal state, the print operation is stopped after one page of paper is discharged in state of white paper, and therefore there is an advantage in preventing the malfunction of print engine unit 20.

While there have been illustrated and described what are considered to be preferred embodiments of the present invention, it will be understood by those skilled in the art that various changes and modifications may be made, and equivalents may be substituted for elements thereof without departing from the true scope of the present invention.

What is claimed is:

1. A print control method of an image forming apparatus including a print engine unit which is controlled by a command applied from a video controller for printing one or more pages of an image on paper in accordance with image data applied from said video controller, said method comprising the steps of:

checking for reception of a vertical synchronizing signal within a predetermined time interval during a print mode of operation;

printing said image on a page of paper fed to an initial printing position, when said vertical synchronizing signal is received within said predetermined time interval;

discharging to an external position of said image forming apparatus said page of paper fed to said initial printing position without printing any information on said page of paper when said vertical synchronizing signal is not received within said predetermined time interval; and stopping said print mode and starting an error mode of operation after discharging said page of paper when said vertical synchronizing signal is not received within said predetermined time interval.

2. The method as set forth in claim 1, further comprising the steps of:

detecting a print command from said video controller;

starting a paper feed operation for feeding said page of paper to said initial printing position when said print command is detected;

transmitting a vertical synchronizing signal request signal to said video controller when said page of paper fed by said paper feed operation reaches said initial printing position;

clearing a time-out variable after said transmitting step;

determining whether said time-out variable is greater than a predetermined value when said step of checking indicates said vertical synchronizing signal has not been received; and increasing said time-out variable by a predetermined time increment value when said time-out variable is not greater than said predetermined value.

3. The method as set forth in claim 1, said step of checking for reception of a vertical synchronizing signal within a predetermined time interval comprising the steps of:

determining whether a time-out variable is greater than a predetermined value when said vertical synchronizing signal has not been received; and increasing said time-out variable by a predetermined time increment value when said time-out variable is not greater than said predetermined value.

4. The method as set forth in claim 3, further comprising the steps of:

detecting a print command from said video controller;

starting a paper feed operation for feeding said page of paper to said initial printing position when said print command is detected;

transmitting a vertical synchronizing signal request signal to said video controller when said page of paper fed by said paper feed operation reaches said initial printing position; and clearing said time-out variable after said transmitting step prior to performing said step of checking for reception of a vertical synchronizing signal.

5. The method as set forth in claim 1, said error mode of operation comprising the steps of:

informing said video controller that an error state exists;

checking for reception of an error release command from said video controller; and placing said print engine unit in a stand-by mode when said error release command is received.

6. The method as set forth in claim 5, said error mode of operation further comprising the steps of:

transmitting said error release command to said print engine unit; and checking for a signal from said print engine unit indicating said error mode has been released.

7. A print control method of an image forming apparatus including a print engine unit which is controlled by a command applied from a video controller for printing one or more pages of an image on paper in accordance with image data applied from said video controller, said method comprising the steps of:

checking for reception of a print command signal from said video controller during a print engine unit stand-by state;

starting a print mode of operation by feeding one page of said paper to a printing position when said print command signal is received;

detecting a leading edge of said fed page of paper when said page of paper reaches said printing position;

transmitting a vertical synchronizing signal request signal to said video controller once said detecting step detects said leading edge of said fed page of paper;

checking for reception of a vertical synchronizing signal within a predetermined time interval during said print mode of operation;

discharging to an external position of said image forming apparatus said fed page of paper without printing any information on said fed page of paper when said vertical synchronizing signal is not received within said predetermined time interval; and stopping said print mode of operation and starting an error mode of operation after discharging said page of paper when said vertical synchronizing signal is not received within said predetermined time interval.

8. The method as set forth in claim 7, further comprising the steps of:

printing said image on said fed page of paper when said vertical synchronizing signal is received within said predetermined time interval;

discharging to said external position said page of paper having said image printed thereon; and returning to said step of checking for reception of a print command signal from said video controller during a print engine unit stand-by state.

9. The method as set forth in claim 8, further comprising remaining in said stand-by state until said print command signal is received.

10. The method as set forth in claim 7, further comprising the steps of:

determining whether a time-out variable is greater than a predetermined value when said vertical synchronizing signal has not been received; and increasing said time-out variable by a predetermined time increment value when said time-out variable is not greater than said predetermined value.

11. The method as set forth in claim 7, said error mode of operation comprising the steps of:

repeatedly informing said video controller that an error state exists until an error release command is received from said video controller; and placing said print engine unit in a stand-by mode when said error release command is received.

12. The method as set forth in claim 11, said error mode of operation further comprising the step of:

repeatedly transmitting said error release command from said video controller to said print engine unit until said video controller receives a signal from said print engine unit indicating said error mode has been released.

13. An image forming apparatus comprising:

a video controller for transmitting command data and image data to a print engine unit, said print engine unit being controlled by said command applied from a video controller for printing one or more pages of an image on paper in accordance with said image data applied from said video controller;

said print engine unit comprising:

engine control means responsive to print command data transmitted by said video controller for generating a first control signal;

mechanism driving means responsive to said first control signal for feeding a page of paper to a printing position;

sensor means providing a detection signal to said engine control means by detecting a leading edge of said page of paper when said page of paper reaches said printing position;

electrophotography means, controlled by a second control signal generated by said engine control means for printing said image on said page of paper when said engine control means receives a vertical synchronizing signal from said video controller, said mechanism driving means being controlled by said engine control means to feed said fed page of paper to an external portion of said image forming apparatus when said engine control means fails to receive said vertical synchronizing signal from said video controller within a predetermined time interval.

14. The image forming apparatus as set forth in claim 13, said print engine unit further comprising:

video interface means for interfacing said engine control means with said video controller; and input/output interface means for interfacing said engine control means with said sensor means, said mechanism driving means and said electrophotography means.

* * * * *